July 14, 1931.  N. M. THOMAS  1,814,195
APPARATUS FOR MAKING CARBON DIOXIDE ICE
Filed Feb. 15, 1929  2 Sheets-Sheet 1
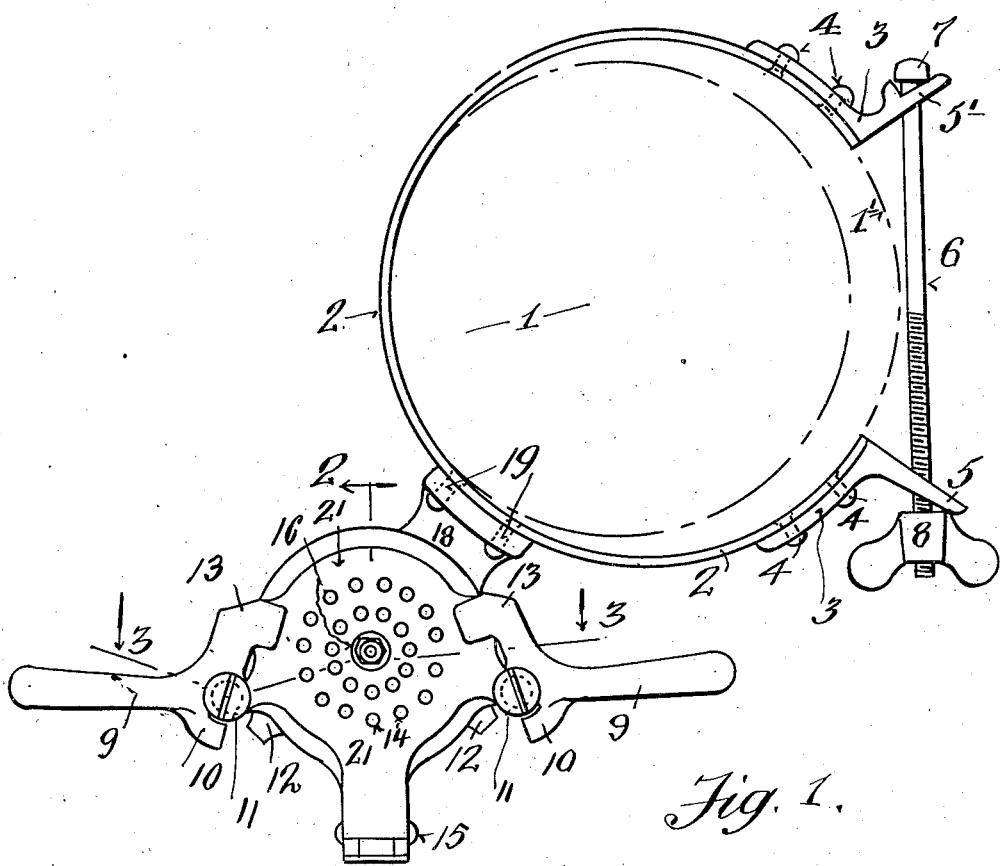
Fig. 1.
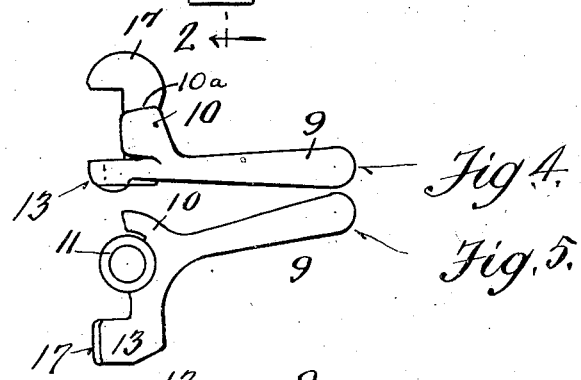
Fig. 4.
Fig. 5.
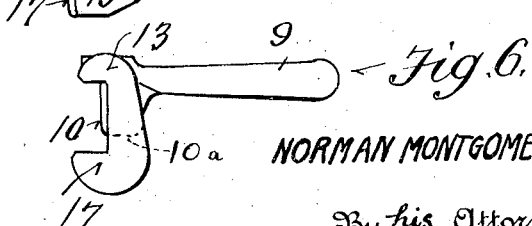
Fig. 6.
NORMAN MONTGOMERY THOMAS, Inventor
By his Attorneys
Darby & Darby July 14, 1931.  N. M. THOMAS  1,814,195
APPARATUS FOR MAKING CARBON DIOXIDE ICE
Filed Feb. 15, 1929   2 Sheets-Sheet 2
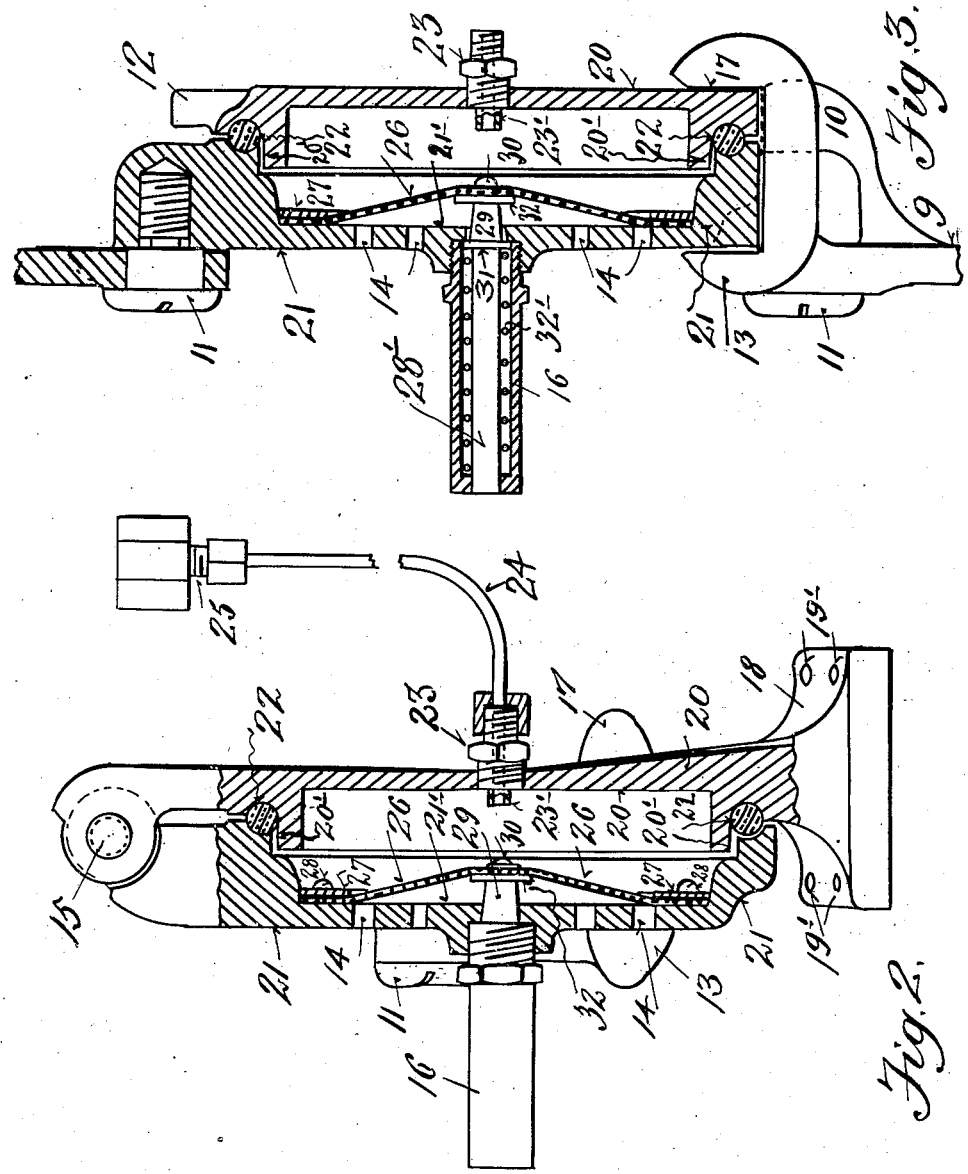
NORMAN MONTGOMERY THOMAS. Inventor
By his Attorneys
Darby & Darby Patented July 14, 1931

1,814,195

UNITED STATES PATENT OFFICE

NORMAN MONTGOMERY THOMAS, OF BROOKLYN, NEW YORK, ASSIGNOR TO THE SOLID CARBONIC COMPANY LTD., OF NEW YORK, N. Y., A CORPORATION OF DELAWARE

APPARATUS FOR MAKING CARBON DIOXIDE ICE

Application filed February 15, 1929. Serial No. 340,081.

This invention concerns an apparatus adapted to home use for the manufacture of carbonic ice wafers.

One of the objects of this invention is the construction of a unit adaptable to home use and adapted to be mounted upon a liquid carbon dioxide cylinder for the manufacture of carbon dioxide snow or ice wafers.

Another object of this invention is the provision of apparatus for conveniently forming carbon dioxide ice wafers.

Another object of this invention is the provision of apparatus adapted to be adjusted upon the standard type of present day liquid carbon dioxide cylinders and attached to such types of cylinders with means providing a chamber, for freezing liquid from said cylinder which is allowed to escape into said means, into a wafer.

Another object of this invention is the provision of a freezing press mounted upon gripping means about a liquid carbon dioxide cylinder, said freezing press containing an indicator to indicate when sufficient liquid carbon dioxide is frozen into a carbon dioxide ice wafer, locking means for locking said freezing press into a locked and closed condition, and further means for breaking the seal caused by the freezing of said ice when in the process of formation.

A still further object of this invention is the provision of a structure adapted to occupy but a small amount of space and yet freeze liquid carbon dioxide in small convenient quantities.

Other objects, as will appear from the following disclosure, are secured by means of this invention.

This invention resides substantially in the combination, construction, arrangement, and relative location of parts, as will appear more fully hereinafter.

Various other objects and advantages of the invention than those hereinabove mentioned will be specifically pointed out or will be apparent hereinafter in the course of the below detailed description of the form of the invention shown, in the accompanying drawings, as preferred ones of the various possible embodiments of the invention; it being understood, naturally, that such forms are merely illustrative of some of the many possible combinations and arrangements of parts well calculated to attain the objects of the invention, and hence said detailed description of such form is not to be taken as at all defining or limiting the invention itself. That is to say, the scope of protection contemplated is of course to be taken from the appended claims, interpreted as broadly as is consistent with the prior art.

In the accompanying drawings—

Figure 1 is a plan view of my novel structure adapted to mounted arrangement;

Fig. 2 is a partial sectional view of the freezing press taken on the section line 2—2 of Fig. 1;

Fig. 3 is a sectional view of the freezing press taken on the line 3—3 of Fig. 1;

Fig. 4 is a right elevational view of the locking handle used on my structure;

Fig. 5 is a top view thereof; and

Fig. 6 is a left elevational view of said handle.

Like numerals refer to like parts throughout the respective views.

Heretofore there have been various attempts made to provide a simple structure which is adapted to be mounted upon the ordinary type of liquid carbon dioxide cylinder of present day use and which, when connected to said cylinder, causes the liquid which is allowed to escape from the cylinder to freeze and form blocks of solid carbon dioxide ice for home use. Various structures have been devised to freeze the escaping liquid by expansion and various mounting means for a freezing press have been devised. There have also been attempts made to indicate when the freezing press is full and attempts made to lock tightly a press and unlock it when full. However, in the past structures many difficulties have been encountered due to the fact that no means were provided to remove the block when completed; to tightly lock the press while the liquid carbon dioxide was expanding and freezing; nor to break the natural frozen seal presented by the carbon dioxide gas snow and ice forming and which tended to lock the press against reopening.

Further than that, difficulty has been encountered in means to mount such a press in close arrangement to a cylinder so that but little space was occupied by the complete operating unit. Difficulty has also been encountered in the method of sealing and connecting the liquid carbon dioxide cylinder to the freezing press. It is my purpose, in a structure which I will hereinafter describe more fully, to remove these various difficulties and to obtain a compact and working structure for this purpose.

Referring particularly to the drawings, it will be seen in Fig. 1 that 1 and 1', represented by dash-dot circles, correspond to the respective cylinder sizes, which cylinders are the ordinary type manufactured today for containing liquid carbon dioxide. 2 represents a flexible metal band on which is mounted the flanges 3 at both ends thereof, these flanges 3 being secured to the metal band 2 by means of rivets 4 and having outer projecting horns 5 and 5', said horns having predeterminedly located therein holes through which passes a threaded rod 6 having a head 7 on which is located a wing nut 8 in threaded relation. It is obvious that tightening down the wing nut 8 brings the horns 5 and 5' together and tends to diminish the inner diameter of the band 2 adapting it to the various sizes of the cylinders.

Riveted to this band by means of rivets 19, and at about 135° or thereabouts away from the point upon the circumference where the projecting horns 5 and 5' would meet if drawn completely together, is the freezing press structure 18. Referring now particularly to the plan view of the freezing press structure shown in Fig. 1 and which is mounted upon the band 2 by means of rivets 19, it will be seen that this structure comprises the general body 18 and the cover plate 21, the hinge element 15, and two handles 9 each of which has formed unitarily thereon the lug 10 which, it will be observed, has a raised, inclined and rounded end 10a and the gripping jaws 13 and 17. Mounted also upon the lower body of the freezing press structure are bosses or outwardly projecting elements 12. When the arms 9 are rotated upon their pivots 11, said pivots being mounted upon the upper plate member 21 of the freezing press, the elements 10 rotate into contact with the bosses 12, initially jam against said bosses, and on their raised, inclined and rounded ends ride up on such bosses to break any seal due to freezing of the liquid carbon dioxide within the freezing press that might have taken place. The uppermost jaws 13 of each arm 9 at the same time engages with the cover plate 21 and the lower jaw 17 engages with the lower body structure of the freezing press. The respective location of the elements 9, 10, 11, 13 and 17 may be particularly observed in Figs. 4, 5 and 6 and the manner in which the unitary arm coacts with the freezing press structure may be observed in Fig. 1. Mounted also in the upper plate 21 are a series of vents 14 and an indicia tube 16, the purpose of which elements will be discussed more fully hereinafter.

Referring to Fig. 2, the body 18 is shown with the holes 19' through which the rivets 19 pass to secure the body to the flexible band 2. The body 18 is shown in perspective and thereabove in section we see the interior layout of my novel freezing press structure. 20 represents the bottom plate or part of the body structure 20 which constitutes the bottom half of my freezing press. 21 represents, as herein before mentioned, the uppermost portion of my freezing press which is adapted to be rotated upon the hinge 15 into locked engagement with the lowermost plate of the freezing press. The inner contour of the lower plate 20 is in the form of a circular cavity having a rim 20'. About this rim is fitted a torroidal rubber seal or gasket 22, which may be secured in place by gluing, cementing, etc. The upper plate has projecting rims, as will be apparent from Fig. 2, to closely contact with this rubber seal and thus prevent any leakage when the elements are clamped together. Mounted into the lower body 20 is the nipple structure 23 which connects, via a thin pipe 24, preferably of copper, to the tap structure 25, which illustratively in this drawing is to be considered as connected to the liquid carbon dioxide tank. Referring again to the upper plate structure 21, it will be found that therein a wire mesh sieve 26 of circular form is secured a metal ring 27 and rivets or screws 28 passing therethrough to such upper plate 21 and to prevent any solid material passing out through the vent holes 14 in the upper plate. This sieve is normally stretched inwardly towards the lowermost portion of the freezing press by means of a rod 28' bearing a shoulder 31 against which a spring 32' works to force said sieve normally downward against the lowermost plate. Said sieve is secured to the element 28' by means of a further shoulder 32 and machine screw 30 which is threaded into said sieve and into the tapered portion 29 of the element 28' which lies between the shoulders 31 and 32.

Now, having described the structure, I will briefly describe the method of operation thereof. Assuming that the element 25 is connected to a liquid carbon dioxide cylinder and with the valve of said cylinder closed and the pressure gauge thereof reading zero I open my locking arms 9 by forcing them back and towards the hinged element 15. I then, holding the structure by both arms, lift the upper plate on its hinge 15 away from the lower plate. The element 23 having a nipple 23' projecting into the cavity of the lower plate 20 presents a circular sharp edge against which I can then force a cardboard or paper plate up to the face of the lower plate 20, the nipple 23' piercing and passing through said cardboard wafer or paper wafer. I then close the structure by bringing the upper plate into engagement with the lower plate and lock the handles 9 by pressing them outwardly from the hinge 15. Then I open the gas tank valve and allow the pressure to rise by observing the gauge to a predetermined amount and allowing the liquid to escape via the elements 25, 24, 23 into the freezing press.

As the liquid comes into the freezing press it vaporizes and rapidly expands and freezes according to well known principles of thermodynamics. The cylindrical cavity within the freezing press rapidly fills up with carbon dioxide or snow freezing into a solid wafer. As the mass of snow increases it presses against the sieve, forces it against the innermost face 21' of the upper plate 21 and carries with it against the action of the spring 32 the element 28', said element 28' gradually rising to extrude from the end of the indicator 16. When the end of the element 28' comes into view from within the element 16, or when a definite portion of said element comes into view, depending on the length of rod used, I know that the cavity in my freezing press has become full of carbon dioxide, ice or snow. There is no danger that too much material may form for after the chamber is filled the freezing ceases and the liquid escapes as gas through the vent holes 14, the sieve operating at the same time to prevent any solid material, such as the frozen gas or ice, from passing through said vent holes.

Now, presuming that the chamber is full, as has been indicated by the indicia arm 28', I shut off the valve to the liquid carbon dioxide cylinder thereby shutting off the supply of liquid gas and I am now ready to remove the frozen wafer or snow from my unit.

In the past structures a user would have difficulty in breaking the seal of the freezing press. This difficulty is no longer present for due to my invention I simply swing back the two arms 9, bring the projecting elements 10 into contact with the lugs 12, cause such elements to ride upon said lugs to break the ice seal, lift back the upper plate 21, and lift out the ice wafer which has formed upon the cardboard or paper circular strip placed within the freezing press. If a snow condition has taken place rather than an ice condition I can scoop out with a little spoon the snow for use in freezing purposes. It is thus apparent that with the structure thus devised I may easily provide carbon dioxide snow or ice for home freezing purposes to be used in connection with the keeping cool of various foods or drinks.

Inasmuch as many changes could be made in the above constructions, and many apparently widely different embodiments of the invention could be made without departing from the scope thereof, it is intended that all matter contained in the above description or shown in the accompanying drawings shall be interpreted as illustrative and not in a limiting sense.

It is also to be understood that the language contained in the following claims is intended to cover all the generic and specific features of the invention herein described, and all statements of the scope of the invention which, philologically speaking and as a matter of language, might be said to fall therebetween.

What I seek to secure by United States Letters Patent is:

1. A refrigerating press fixedly mounted upon an adjustable metal band for securing said refrigerating press to a liquid carbon dioxide cylinder, said press comprising means for freezing liquid carbon dioxide into snow in wafer form and seal breaking means secured to said press for breaking any frozen condition that arises when the press is filled.

2. A freezing press mounted for adaptation to a liquid carbon dioxide cylinder comprising a freezing cavity, means to indicate when said cavity is filled, means for connecting said freezing press to said cylinder, means for securing said freezing press in locked condition, and means for breaking said locked condition and any frozen condition that has arisen when said freezing press is filled.

3. A freezing press structure comprising a lower plate, an upper plate, means located in the lower plate of said freezing press for admitting liquid carbon dioxide to said freezing press, means for indicating when said freezing press is full, means for allowing the overplus of the gas to escape via vent holes in the upper plate of said freezing press, means providing a seal for preventing leakage while said freezing press is being filled, and means for ultimately breaking the seal of said freezing press.

4. In an apparatus for freezing liquid carbon dioxide into solid carbon dioxide wafers or snow for home use, a freezing press structure comprising a lower plate having a cavity therein, means in said lower plate for admitting liquid carbon dioxide to said cavity, an upper plate having a series of vent holes therein, a sieve structure mounted innermost of said vent holes, said sieve being adapted to coact with an indicia arm to indicate when the cylindrical cavity in said freezing press is filled, torroidal sealing means to provide an airtight seal between said upper and lower plates of said freezing press when in close engagement, locking jaws to lock said upper plate against said lower plate, and a lug element carried unitarily with said locking jaws adapted to coact against the boss mounted upon said lower plate to break a seal formed by the freezing of liquid carbon dioxide into a wafer.

5. In a type of apparatus substantially hereinbefore described, a freezing press comprising an upper and lower plate, locking means for securing said upper and lower plate into interlocked relationship, and means carried by said locking means for breaking a carbon dioxide snow seal formed by freezing which consists in a lug carried by said locking means which is adapted to coact with a boss mounted on the lower plate of said freezing press.

6. In the type of apparatus described, means including two hollowed out plates for forming liquid carbon dioxide into snow and ice, means for locking said plates together and means for breaking said locked relationship.

7. In the type of apparatus described, means for securing a freezing press carrying locking means and seal breaking means to liquid carbon dioxide cylinders of various dimensions.

8. In the type of apparatus described, means for securing the upper plate of a freezing press to the lower plate of a freezing press, and means to break the seal formed when said plates are frozen together.

9. In the type of apparatus described, means for sealing a freezing press comprising two cooperating plates together which comprises a rotatable arm having an upper and a lower jaw and a lug, and bosses mounted on the lower plate of said freezing press against which said lugs are adapted to coact to break the seal.

10. A freezing press structure of the type described for freezing liquid carbon dioxide into snow, comprising a plurality of press members, an inlet port in one of said members, vent holes in the other of said members together with an indicia element mount thereon for indicating when said press is full, means for locking said members together and unlocking them and breaking any frozen seal formed therebetween.

11. A freezing press structure of the type described for freezing liquid carbon dioxide into snow, two hollow plates adapted to tight sealing, an inlet port in one of said plates, vent holes and a flexible sieve mounted on the interior face of the other of said hollow plates, means for normally distending said sieve away from said face, an indicia carried integral with said sieve for indicating when said press is filled and means for thereafter breaking the frozen seal existing between the hollow plates.

12. A freezing press comprising two hollow members within which are allocated means to admit liquefied gases to expand, means to vent said press, means to indicate when said press is filled, and without which members are allocated means to lock said members together and break said members ultimately apart.

13. A freezing press structure providing an expansion chamber, means to admit liquefied gases to said chamber, means to vent said chamber, means to sieve said vent means, means to indicate when said chamber is full of snow caused by the rapid expansion of said liquefied gases within said chamber, and means for clamping and unclamping said structure, said last mentioned means also being adapted to break any frozen seal existing on said structure.

14. A freezing press structure comprising two hinged hollow plate members, means to lock and unlock said hollow plate members, means to admit liquefied gases to the chamber formed by the clamping together of said two hollow plate members, means to vent said chamber, means to sieve said vent means, means to indicate when said chamber is full of snow caused by the rapid expansion of said liquefied gases within said chamber, and means for clamping and unclamping said structure, said last mentioned means also being adapted to break any seal existing between the plate members.

In testimony whereof I have hereunto set my hand on this 21st day of January, A. D. 1929.

NORMAN MONTGOMERY THOMAS.